Patented Aug. 14, 1945

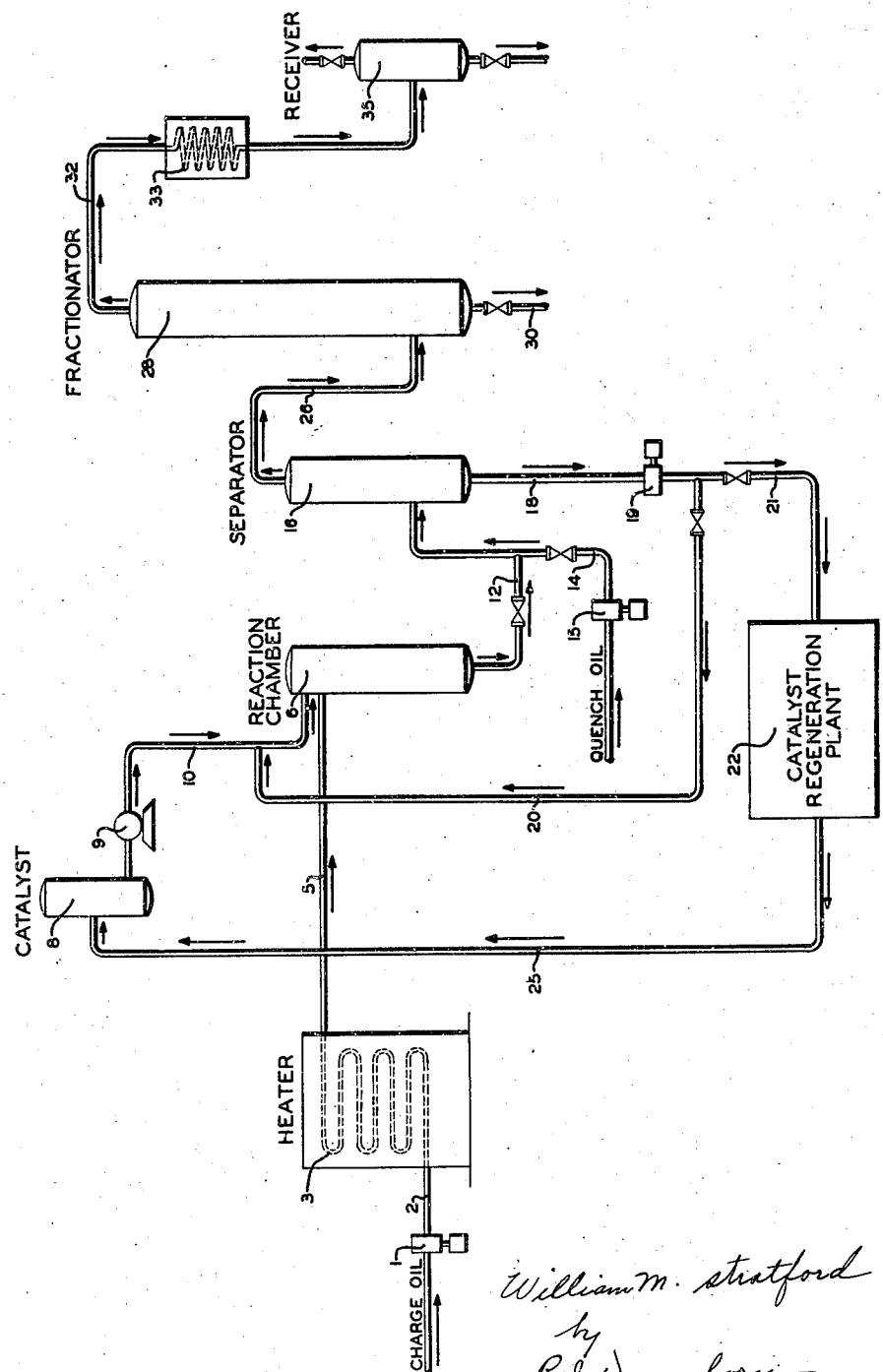

2,382,270

UNITED STATES PATENT OFFICE 2,382,270

CONVERSION OF HYDROCARBON OILS

William M. Stratford, New York, N. Y., assignor to The Texas Company, New York, N. Y., a corporation of Delaware Application June 4, 1942, Serial No. 445,701

3 Claims. (Cl. 196—52)

This invention relates to the conversion of hydrocarbon oils and has to do particularly with the cracking of higher boiling oils into lower boiling products, such as gasoline, in the presence of a catalyst.

The present application is a continuation-in-part of my pending application, Serial No. 267,840, filed April 14, 1939.

In the conversion of hydrocarbon oils wherein the oil is subjected to high temperatures for sufficient time to effect cracking, there is usually recombination or polymerization of unsaturated materials to form products which tend to produce heavy undesirable bodies, such as tar or coke. For this reason it is customary in thermal cracking to heat the oil as quickly as possible to a cracking temperature and then allow the cracking reaction to take place in a large zone wherein deposition of coke may take place.

In the catalytic cracking of oils the oil is heated to a conversion temperature and the vapors contacted with a catalyst for a sufficient length of time to produce the desired cracking reaction. Many of the active cracking catalysts promote polymerization and the contact of the oil with the catalyst for an appreciable length of time provides an opportunity for substantial polymerization to take place. Whether the cause is due to polymerization is not definitely known, but in any event, it is common experience that the catalyst becomes coated with carbon and requires regeneration at frequent intervals.

According to the present invention, the oil to be cracked is raised to a high cracking temperature in excess of that normally used or necessary to obtain cracking and then the hot oil contacted with a catalyst for a very short and controlled period of time. At such elevated temperatures the cracking reaction takes place much more rapidly and only a short time of contact is necessary whereby formation of coke is substantially retarded. The efficiency of the catalyst accordingly is maintained at a high level during its residence in the reaction zone.

The present invention may be conducted by heating the oil to a high cracking temperature as quickly as possible, preferably without substantial cracking. The heating may take place in a direct fire furnace wherein the oil is passed through tubes of suitable size and at the proper rate to obtain a high cracking temperature quickly and preferably near the exit of the coil. If desired, other means of rapid heating may be used, for example, fluid baths such as hot molten metal, for example, lead.

The temperature to which the oil may be heated in the heating stage will vary, depending on the type of oil, but it is advantageous to heat the oil to temperatures in the range 900 to 1100° F., the catalytic conversion being carried out at a temperature in this range.

The hot oil is contacted preferably in the vapor phase with an active cracking catalyst under conditions such that a very short and controlled time of contact may be obtained.

The time of contact of the oil with the catalyst will vary but should be sufficiently low that substantially no thermal cracking occurs. Ordinarily in catalytic cracking the time should be less than about 100 seconds. In the present process the time is considerably less than normally used even for catalytic cracking as practiced heretofore. According to the present invention, wherein the oil is heated to a high temperature, the time of contact with the catalyst may be cut down to $2/3$, $1/2$ or even $1/3$ the time normally required for catalytic cracking.

In accordance with the present invention the residence time of the catalyst within the reaction zone may be substantially less than that of the heated oil vapor, particularly when operating in the manner illustrated in the drawing wherein a stream of solid catalyst particles continually moves through the reaction zone. The residence time of the catalyst advantageously does not exceed one minute and preferably is substantially less than one minute. For example, the residence time for the catalyst may range from about 1 to 7 seconds or may be as low as a fraction of a second, while the residence time of the heated oil within the reaction zone may range from about 2 to 15 seconds.

Where it is desired to maintain a time of contact between hydrocarbons and catalyst of the order of one second or less the residence time of the hydrocarbons within the reaction zone may be approximately or slightly greater than that of the catalyst. On the other hand the residence time of the hydrocarbon may range from $1\frac{1}{2}$ to 4 or 5 times that of the catalyst.

It is contemplated that the higher the reaction temperature the shorter will be the residence time for both oil and catalyst within the reaction zone.

According to one advantageous mode of operation the oil vapor heated to the reaction temperature flows downwardly through an enlarged vertical reaction zone. The catalyst in solid particle form is also introduced continuously to the top of the reaction zone and drops through the zone. While dispersed throughout the oil vapor both hydrocarbon and catalyst are continuously removed from the bottom or lower portion of the reaction zone.

The ratio of catalyst to oil within the reaction zone may be less than 1 or as much as 4 or 5 to 1 or even 20 to 1.

The particle size and density affects the rate of catalyst fall through the reaction zone so that by suitable sizing of the catalyst particles and also depending upon the manner of injection in the reaction zone considerable variation in the residence time of the catalyst within the reaction zone may be secured.

If desired a horizontal reaction vessel may be employed through which the hydrocarbon vapors flow in a horizontal direction, while the catalyst particles flow in a substantially vertical direction. By having the horizontal dimension relatively great as compared to the vertical dimension of the reaction zone the residence time of the hydrocarbons may be relatively great compared to that of the catalyst.

The time of exposure of the catalyst and oil to the high cracking temperature is controlled by regulating the time the catalyst and oil is in the reaction zone, and then quickly quenching the oil to a temperature sufficiently low to arrest the reaction. The quenching is preferably accomplished by injecting a cooling medium such as oil, for example, gas oil or naphtha or other oil suitable as a charge to the unit, or a product from the unit, including recycle stock or other material of higher boiling point than naphtha.

The quenched hydrocarbon reaction products are fractionated to recover the cracked naphtha, while the withdrawn catalyst is regenerated and recycled to the reaction.

Any well known or preferred type of catalyst may be used. Specific materials contemplated are highly adsorptive clays, such as acid treated clays, for example, Filtrol or Super-Filtrol, or other acid treated montmorillonites or bentonites; Activated Alumina; natural or artificial zeolites or similar base exchange adsorptive materials; silica gel, or other adsorptive silica alone or coated with an oxide of certain metals of groups III and IV, such as alumina or zirconia, or an oxide of a metal of group VI, such as an oxide of chromium, molybdenum or tungsten; or mixtures of oxides of groups III, IV and VI, such as mixtures of oxides of aluminum or zirconium and chromium or molybdenum.

The process may be carried out at substantially atmospheric pressure or slightly above, such as 50 or 100 pounds. Also various gases may be introduced to retard side reactions and carbon formation, such as hydrogen, nitrogen, water vapor and the like.

The invention will be more fully understood from the following description read in connection with the accompanying drawing which shows one form of apparatus for carrying out the process of the invention.

Referring to the drawing, charge oil is introduced by the pump 1 through the line 2 to a heating coil 3, wherein the oil is raised to a high cracking temperature. The products are then transferred through a line 5 to a reaction chamber 6. The supply of catalyst is contained in a chamber 8 in a suitable form, such as a slurry, whereby it may be pumped by the pump 8 through the line 10 and injected into the reaction chamber. The reaction products are withdrawn from the lower portion of the reaction chamber through the line 12 and contacted with a quench oil introduced through the line 14 by the pump 15.

The mixture at a temperature below cracking is then introduced into a separator 16. In the separator the catalyst separates out and is withdrawn from the lower portion thereof through the line 18 and may be recycled to the reaction chamber 6 by the pump 19 through the line 20. Preferably the catalyst is passed through the line 21 to a catalyst regeneration plant 22. This plant is shown diagrammatically and may consist of a filter for filtering the heavy oil from the catalyst and suitable means for removing the carbon from the catalyst, for example by burning or roasting. The regenerated catalyst is then conducted through the line 25 to the catalyst chamber 8.

Hydrocarbon vapors are passed from the upper portion of the separator 16 through the line 26 to a fractionator 28, wherein the insufficiently cracked products are separated from vapors containing a gasoline fraction. The high boiling fraction collecting in the lower portion of the fractionator 28 is withdrawn through the line 30 and may be recycled to the heating coil 3 for further cracking or withdrawn from the system for further use, such as a charge for thermal cracking or as a fuel oil. The vapors containing gasoline and lighter constituents are passed overhead from the fractionator 28 through vapor line 32 and condenser 33 to a receiver 35.

An important advantage of the method of flow illustrated in the drawing involves providing a relatively short residence time for the catalyst within the reactor. The residence time for the catalyst is less than for the hydrocarbons in the reactor because the catalyst particles fall through the hydrocarbon vapors in the reactor by difference in density arriving at the outlet from the reactor before the hydrocarbons with which the catalyst entered. Since the hydrocarbon vapors and catalyst particles both flow in a downward direction the rapid descent of the catalyst particles is facilitated. Accordingly, the catalyst particles actually remain in the reaction zone a substantially shorter time than the hydrocarbons which are undergoing conversion.

Thus, the decline in catalyst activity is substantially reduced since less time within the reaction zone is afforded for deposition of carbon on the catalyst particles. By regenerating all of the withdrawn catalyst prior to its return to the top of the reactor all of the catalyst actually within the reactor is thus maintained at a very high state of activity during the entire time that it is within the reactor.

Effecting conversion by the action of a catalyst which remains at a high level of actitvity during the entire period of residence in the reactor is advantageous from the standpoint of producing high octane gasoline which has a high lead susceptibility. It appears that catalytic conversion under these conditions favors the hydrogen transfer reaction whereby naphthene hydrocarbons are converted to aromatics and hydrogen and the resulting hydrogen is ultilized to combine with olefins formed from the conversion of other constituents of the feed. As a consequence there is produced a more saturated gasoline product of high octane value.

Instead of introducing the catalyst to the reactor in the form of a slurry, it may be introduced in dry, solid form and provision may be made for its separate removal from the bottom of the reactor in relatively dry form.

Obviously many modifications and variations of the invention, as hereinbefore set forth, may be made without departing from the spirit and scope thereof, and therefore only such limitations should be imposed as are indicated in the appended claims.

I claim:

1. A continuous process for the catalytic cracking of hydrocarbons wherein both hydrocarbons and catalyst flow through a reaction zone, the catalyst being recycled all or in part to produce high octane gasoline hydrocarbons which comprises passing a stream of gas oil in vapor phase to a reaction zone maintained at a temperature in the range about 900 to 1100° F., continuously introducing a finely divided solid catalyst in highly active form to said reaction zone, maintaining feed hydrocarbon vapor and catalyst in brief and intimate contact within the zone, said contact being made in the substantial absence of recycled catalyst which has not been regenerated, maintaining the residence time of the catalyst within the reaction zone in the range from a fraction of a second to about 7 seconds, maintaining the residence time of hydrocarbon within the reaction zone greater than that of the catalyst but not more than about 1½ to 5 times that of the catalyst, continuously withdrawing reacted and unreacted hydrocarbons and continuously withdrawing catalyst from the reaction zone while still in a state of high activity.

2. A continuous process for the catalytic conversion of hydrocarbons which comprises heating gas oil to a temperature in the range 900 to 1100° F. without substantial cracking, continuously passing a stream of said heated gas oil in vapor phase through a reaction zone at a temperature within the aforesaid range, continuously passing through the reaction zone a highly active solid catalyst in finely divided form, maintaining the catalyst residence time within the reaction zone in the range from a fraction of a second to about seven seconds and substantially less than that of the oil, maintaining the oil residence time in the reaction zone within the range about 2 to 15 seconds, continuously withdrawing reacted and unreacted hydrocarbons from the reaction zone, and continuously withdrawing catalyst from the reaction zone while still in a state of high activity.

3. A continuous process for the catalytic conversion of hydrocarbons which comprises heating gas oil to a temperature in the range 900 to 1100° F. without substantial cracking, continuously passing a stream of said heated gas oil in vapor phase through a reaction zone at a temperature within the aforesaid range, continuously passing through the reaction zone a highly active solid catalyst in finely divided form, maintaining the catalyst residence time within the reaction zone in the range from a fraction of a second to about 7 seconds, maintaining the hydrocarbon residence time within the reaction zone greater than that of the catalyst but not more than about 1½ to 5 times that of the catalyst, continuously withdrawing reacted and unreacted hydrocarbons from the reaction zone, and continuously withdrawing catalyst from the reaction zone while still in a state of high activity.

WILLIAM M. STRATFORD.